(12) United States Patent
Zhu

(10) Patent No.: US 11,940,019 B2
(45) Date of Patent: Mar. 26, 2024

(54) SHAFT TUBE JOINT STRUCTURE OF DRIVE SHAFT

(71) Applicant: Shanghai GKN Huayu Driveline Systems Company Limited, Shanghai (CN)

(72) Inventor: Zhuoxuan Zhu, Shanghai (CN)

(73) Assignee: Shanghai GKN Huayu Driveline Systems Company Limited, Shanghai (CN)

(*) Notice: Subject to any disclaimer, the term of this patent is extended or adjusted under 35 U.S.C. 154(b) by 0 days.

(21) Appl. No.: 18/036,662

(22) PCT Filed: Sep. 1, 2021

(86) PCT No.: PCT/CN2021/115980
§ 371 (c)(1),
(2) Date: May 12, 2023

(87) PCT Pub. No.: WO2022/105363
PCT Pub. Date: May 27, 2022

(65) Prior Publication Data
US 2023/0323920 A1    Oct. 12, 2023

(30) Foreign Application Priority Data
Nov. 20, 2020   (CN) .......................... 202011309890.6

(51) Int. Cl.
*F16D 3/20*  (2006.01)
*F16D 1/027*  (2006.01)

(52) U.S. Cl.
CPC ............... *F16D 3/20* (2013.01); *F16D 1/027* (2013.01); *F16D 2200/0052* (2013.01); *Y10S 285/915* (2013.01); *Y10T 403/477* (2015.01)

(58) Field of Classification Search
CPC .... F16D 3/20; F16D 1/027; F16D 2200/0052; Y10S 285/915; Y10T 403/477
(Continued)

(56) References Cited

U.S. PATENT DOCUMENTS 6,022,054 A    2/2000  Hemphill et al.
2019/0360626 A1   11/2019  Apicella et al.

FOREIGN PATENT DOCUMENTS

CN    1995792 A    7/2007
CN  106402558 A    2/2017
(Continued)

*Primary Examiner* — Greg Binda
(74) *Attorney, Agent, or Firm* — IPRTOP LLC

(57) ABSTRACT

A shaft tube joint structure of a drive shaft is disclosed. The structure includes an extension tube, a shaft tube, a convex tube, a concave tube, an inner adhesive rubber ring and an outer adhesive rubber ring; the extension tube and the shaft tube are abutted to each other; the convex tube is sleeved in the extension tube and the shaft tube at the abutting position therebetween, an inner seam having a variable gap size distribution is formed in an axis direction; the concave tube is sleeved on the extension tube and the shaft tube at the abutting position therebetween, an outer seam having a variable gap size distribution is formed in the axis direction. The inner adhesive rubber ring and the outer adhesive rubber ring are fully used for simultaneously transmitting a power torque, thus improving the power torque bearing capability of the shaft tube joint structure.

14 Claims, 7 Drawing Sheets

(58) Field of Classification Search
USPC .................................. 464/90, 182; 285/295.3
See application file for complete search history.

(56) References Cited

FOREIGN PATENT DOCUMENTS

| | | | | |
|---|---|---|---|---|
| CN | 107044477 | A | 8/2017 | |
| CN | 110131323 | A | 8/2019 | |
| CN | 112431866 | | 3/2021 | |
| GB | 2 004 980 | A * | 4/1979 | ................... 285/915 |
| JP | 2000320529 | A | 11/2000 | |
| JP | 2014070667 | A | 4/2014 | |

* cited by examiner

SHAFT TUBE JOINT STRUCTURE OF DRIVE SHAFT

FIELD OF THE INVENTION

The present disclosure relates to the field of drive shafts for automobiles, in particular, to a shaft tube joint structure of a drive shaft for automobiles.

BACKGROUND OF THE INVENTION

At present, a drive shaft for automobiles is a key component for transmitting the power of an engine or a motor to a front axle or a rear axle of a chassis. During power transmission, the drive shaft bears a huge power torque load, so the strength, stiffness, efficiency and fatigue durability of the drive shaft have a significant impact on the service performance of automobiles. In order to improve the comprehensive performance of a power transmission system for automobiles and achieve the objectives of energy conservation and emission reduction, the use of a drive shaft made of a lightweight carbon fiber composite material is an effective development direction.

The drive shaft made of the carbon fiber composite material is usually composed of a shaft tube made of the carbon fiber composite material in the middle and universal joints connected at two ends of the shaft tube by adhesive bonding. At present, since the shaft tube made of the carbon fiber composite material can only be made into a straight tube with a uniform wall thickness, the bonding mode between the shaft tube made of the carbon fiber composite material and the universal joints is usually as follows: (I) an outer cylindrical surface of an extension tube of the universal joint and an inner cylindrical surface at an end of the shaft tube made of the carbon fiber composite material are directly overlapped; alternatively, (II) an inner cylindrical surface of an extension tube of the universal joint and an outer cylindrical surface at an end of the shaft tube made of the carbon fiber composite material are directly overlapped and then bonded together through the adhesive in the gap between the two cylindrical surfaces at the overlapped part, that is, a mode of adhesive bonding after single-sided overlapping is used. According to the mode of adhesive bonding after single-sided overlapping, only a single connecting surface bears a power torque, resulting in a low power torque bearing capability of the joint part of the shaft tube. In an overlapping seam, the circumferential shear stress caused by a power torque is expressed as follows: the circumferential shear stress at two ends of the overlapping seam is large, and the circumferential shear stress at the middle part of the overlapping seam is small, that is, there is a relatively serious stress concentration phenomenon in the overlapping seam due to uneven distribution of the circumferential shear stress caused by the power torque, which further reduces the power torque bearing capability of the joint part of the shaft tube made of the carbon fiber composite material.

Therefore, a shaft tube joint structure of a drive shaft with high strength is needed.

SUMMARY OF THE INVENTION

The present disclosure provides a shaft tube joint structure of a drive shaft with high shear stress resistance, to improve the power torque bearing capability of the shaft tube joint of the drive shaft.

The shaft tube joint structure of the drive shaft includes an extension tube, a shaft tube abutted to the extension tube in an axis direction, a convex tube sleeved in the extension tube and the shaft tube at the abutting position therebetween, a concave tube sleeved on the extension tube and the shaft tube at the abutting position therebetween, an inner adhesive rubber ring disposed between the convex tube and the extension tube, and an outer adhesive rubber ring disposed between the concave tube and the extension tube. An inner seam having a variable gap size distribution in the axis direction is formed between the outer circumferential surface of the convex tube and the inner cylindrical surface of the extension tube as well as the inner cylindrical surface of the shaft tube at the abutting position therebetween. The inner adhesive rubber ring is filled in the inner seam. An outer seam having a variable gap size distribution in the axis direction is formed between the concave tube and the outer cylindrical surface of the extension tube as well as the outer cylindrical surface of the shaft tube at the abutting position therebetween. The outer adhesive rubber ring is filled in the outer seam.

Preferably, the shaft tube is made of a carbon fiber composite material.

Preferably, the shaft tube joint structure of a drive shaft further includes a universal joint, and the extension tube is a part of the universal joint, which extends from the universal joint and extends in the axis direction.

Preferably, the diameter at the middle part of the outer circumferential surface of the convex tube is greater than the diameters at both ends of the outer circumferential surface of the convex tube.

Further, a bus bar of the outer circumferential surface of the convex tube is an elliptical arc that is convex in the middle.

Further, the bus bar of the outer circumferential surface of the convex tube is formed by a smooth transition connection between a middle linear segment and end linear segments inclined inward at two ends of the middle linear segment.

Preferably, the diameter at the middle part of the inner circumferential surface of the concave tube is less than the diameters at two ends of the inner circumferential surface of the concave tube.

Further, the bus bar of the inner circumferential surface of the concave tube is an elliptical arc that is concave in the middle.

Further, the bus bar of the inner circumferential surface of the concave tube is formed by a smooth transition connection between a middle linear segment and end linear segments inclined outward at two ends of the middle linear segment.

The concave tube and the convex tube are manufactured by processing a metal blank tube through expansion forming, rotary forging forming or rolling forming.

Further, the concave tube and the convex tube are manufactured by contour machining of a non-metal material by using a plastic molding process.

Preferably, the inner adhesive rubber ring has a variable thickness size distribution in the axis direction and is formed by coating the inner seam with an adhesive and solidifying the adhesive.

Preferably, the gap at the middle part of the inner seam is less than the gaps at two ends of the inner seam, so that the thickness at the middle part of the inner adhesive rubber ring is less than the thicknesses at two ends of the inner adhesive rubber ring.

Preferably, the outer adhesive rubber ring has a variable thickness size distribution in the axis direction and is formed by coating the outer seam with an adhesive and solidifying the adhesive.

Preferably, the gap at the middle part of the outer seam is less than the gaps at two ends of the outer seam, so that the thickness at the middle part of the outer adhesive rubber ring is less than the thicknesses at two ends of the outer adhesive rubber ring.

The shaft tube joint structure of the drive shaft provided in the present disclosure has the beneficial effect that the inner adhesive rubber ring and the outer adhesive rubber ring can be fully used for simultaneously transmitting a power torque, thus improving the power torque bearing capability of the shaft tube joint of the drive shaft. According to the shaft tube joint structure of the drive shaft provided in the present disclosure, after the extension tube and the shaft tube are abutted to each other, the convex tube and the concave tube are added inside and outside for double-sided bonding to form the inner adhesive rubber ring with a variable thickness and the outer adhesive rubber ring with a variable thickness to simultaneously transmit the power torque. The above bonding mode basically eliminates the stress concentration phenomenon in the inner adhesive rubber ring and the outer adhesive rubber ring due to uneven distribution of the circumferential shear stress caused by the power torque, which further improves the power torque bearing capability of the shaft tube joint of the drive shaft.

The above description is an overview of the technical solution of the present disclosure. In order to better understand the technical means of the present disclosure and implement the technical means in accordance with the contents of the specification, the present disclosure is described in detail below with preferred embodiments in combination with the accompanying drawings.

LIST OF REFERENCE NUMERALS

Figure 1:
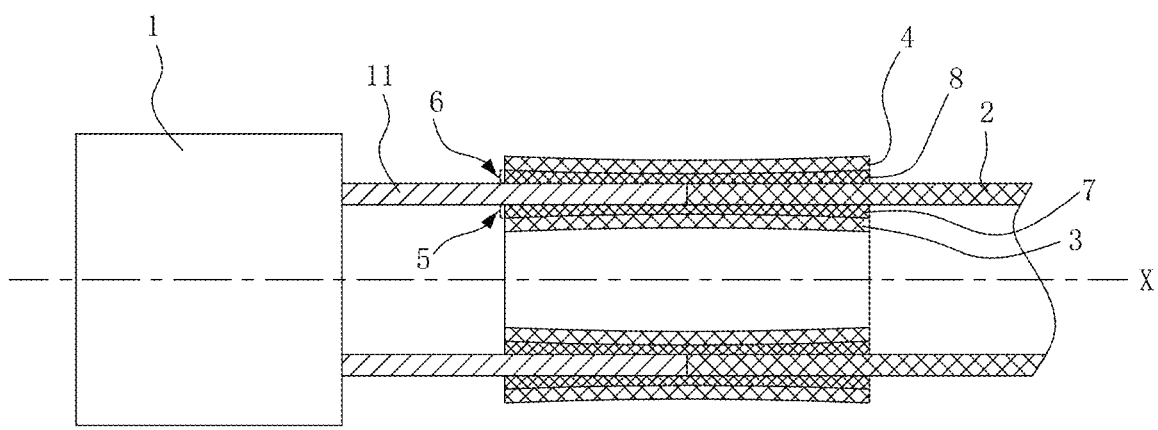
FIG. 1 is a schematic diagram of a longitudinal section of a shaft tube joint structure of a drive shaft according to an embodiment of the present disclosure.

1 Universal joint
11 Extension tube
111 Inner cylindrical surface of extension tube
112 Outer cylindrical surface of extension tube
2 Shaft tube
21 Outer cylindrical surface of shaft tube
22 Inner cylindrical surface of shaft tube
3 Convex tube
31 Outer circumferential surface of convex tube
311 Middle linear segment
312 Left-end linear segment
313 Right-end linear segment
4 Concave tube
41 Inner circumferential surface of concave tube
411 Middle linear segment
412 Left-end linear segment
413 Right-end linear segment
5 Inner seam
6 Outer seam
7 Inner adhesive rubber ring
8 Outer adhesive rubber ring

DETAILED DESCRIPTION OF THE INVENTION

The embodiments of the present disclosure will be described below through exemplary embodiments.

Those skilled in the art can easily understand other advantages and effects of the present disclosure according to contents disclosed by the specification. It should be understood that the structures, proportions, sizes, and the like, which are illustrated in the drawings of the present specification, are used to clarify the contents disclosed in the specification for understanding and reading by those skilled, and are not intended to limit the implementation of the present disclosure, thus are not technically meaningful. Any modification of the structure, change of the scale, or adjustment of the size should still fall within the scope of the technical contents disclosed by the present disclosure without affecting the effects and achievable objectives of the present disclosure. In the meantime, the terms "upper", "lower", "left", "right", "intermediate" and "one" as used in this specification are also for convenience of description, and are not intended to limit the scope of the present disclosure, and the change or adjustment of the relative relationship is considered to be within the scope of the present disclosure without substantial changes in technology.

As shown in FIG. 1, the present disclosure provides a shaft tube joint structure of a drive shaft, including an extension tube 11, a shaft tube 2, a convex tube 3, a concave tube 4, an inner adhesive rubber ring 7 and an outer adhesive rubber ring 8.

Figure 2:
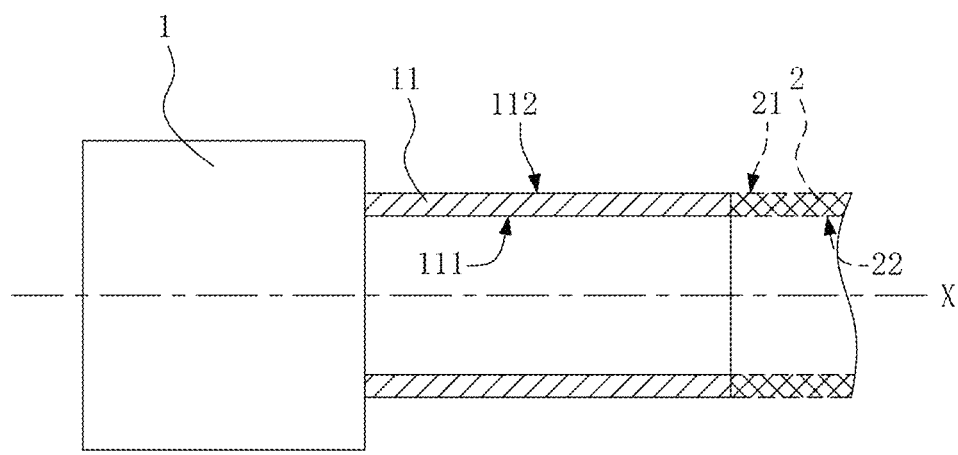
FIG. 2 is a schematic diagram of a longitudinal section of a universal joint according to an embodiment of the present disclosure.

As shown in FIG. 1 and FIG. 2, the extension tube 11 is a part of a universal joint 1, which extends from the universal joint 1 and extends in an axis direction X. The extension tube 11 has an inner cylindrical surface 111 of the extension tube and an outer cylindrical surface 112 of the extension tube, which are respectively located inside and outside the extension tube 11.

Figure 3:
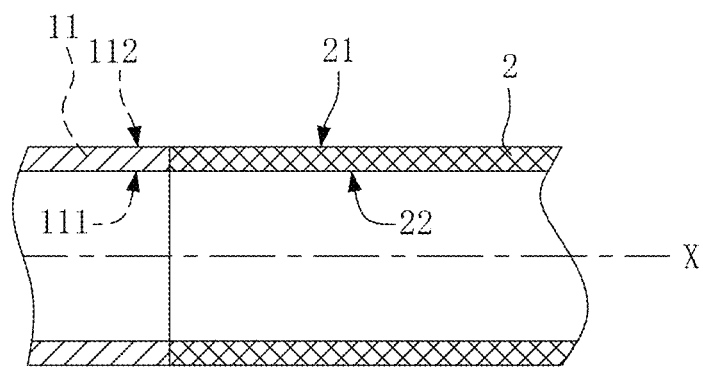
FIG. 3 is a schematic diagram of a longitudinal section of a shaft tube according to an embodiment of the present disclosure.

As shown in FIG. 1 and FIG. 3, the shaft tube 2 is preferably made of a carbon fiber composite material. The front end of the shaft tube 2 is abutted to the rear end of the extension tube 11 in the axis direction X, such as left-right abutting as shown in FIG. 1 and FIG. 3. The shaft tube 2 has an outer cylindrical surface 21 of the shaft tube and an inner cylindrical surface 22 of the shaft tube, the inner cylindrical surface 111 of the extension tube is abutted to the inner cylindrical surface 22 of the shaft tube, and the outer cylindrical surface 112 of the extension tube is abutted to the outer cylindrical surface 21 of the shaft tube. Therefore, when the inner cylindrical surface 111 of the extension tube is abutted to the inner cylindrical surface 22 of the shaft tube, the two tubes 11 and 2 form a single inner cylindrical surface 111, 22 and a single outer cylindrical surface 112, 21 that respectively extends continuously in the axis direction X.

Figure 4:
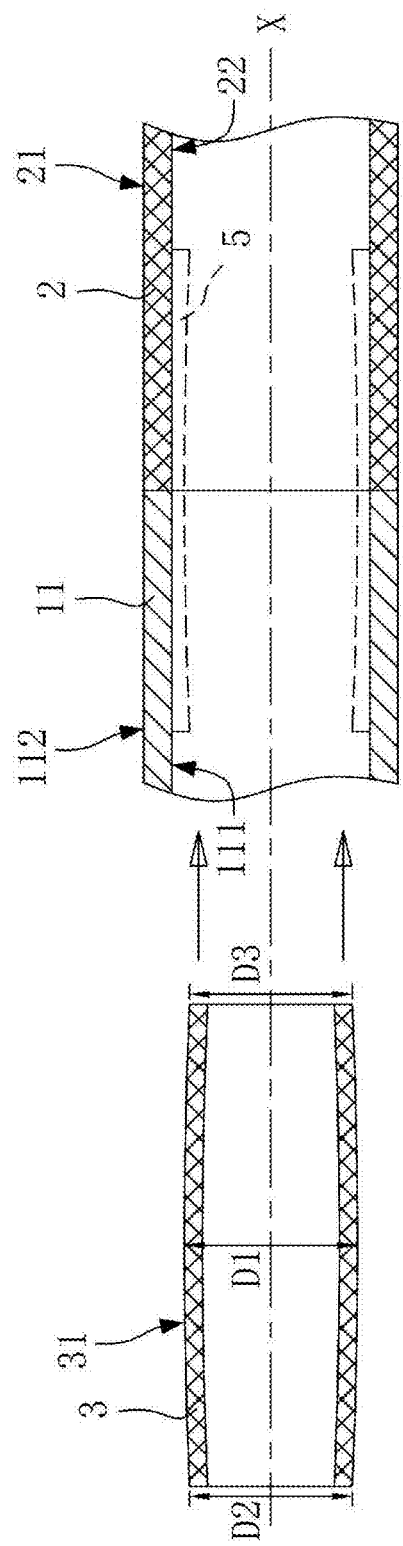
FIG. 4 is a schematic diagram of an assembly relationship between a convex tube and an extension tube as well as a shaft tube according to an embodiment of the present disclosure.

As shown in FIG. 1 and FIG. 4, the middle part of an outer circumferential surface 31 of the convex tube 3 is convex outward, that is, the diameter D1 at the middle part of the outer circumferential surface 31 of the convex tube is greater than the diameters D2 and D3 at two ends of the outer circumferential surface 31 of the convex tube. As shown in FIG. 4, a bus bar of the outer circumferential surface 31 of the convex tube is an elliptical arc that is convex in the middle. The convex tube 3 is sleeved in the extension tube 11 and the shaft tube 2 at the abutting position therebetween in the axis direction X, and the convex tube 3 is located inside the inner cylindrical surface 111 of the extension tube and the inner cylindrical surface 22 of the shaft tube. An inner seam 5 is formed between the outer circumferential surface 31 of the convex tube and the inner cylindrical surface 111 of the extension tube as well as the inner cylindrical surface 22 of the shaft tube at the abutting position therebetween. Since the middle part of the outer circumferential surface 31 of the convex tube is convex outward, the inner seam 5 has a variable gap size distribution in the axis direction X.

As shown in FIG. 4, specifically, the convex tube 3 is precisely manufactured directly by a cutting-free process, which is conducive to saving the material consumption, simplifying the manufacturing process, increasing the production efficiency and reducing the manufacturing cost. The convex tube 3 can be manufactured by processing a metal blank tube such as a steel tube through expansion forming, rotary forging forming or rolling forming. Alternatively, the convex tube 3 can be manufactured by contour machining of a non-metal material such as a carbon fiber composite material by using a plastic molding process.

Figure 5:
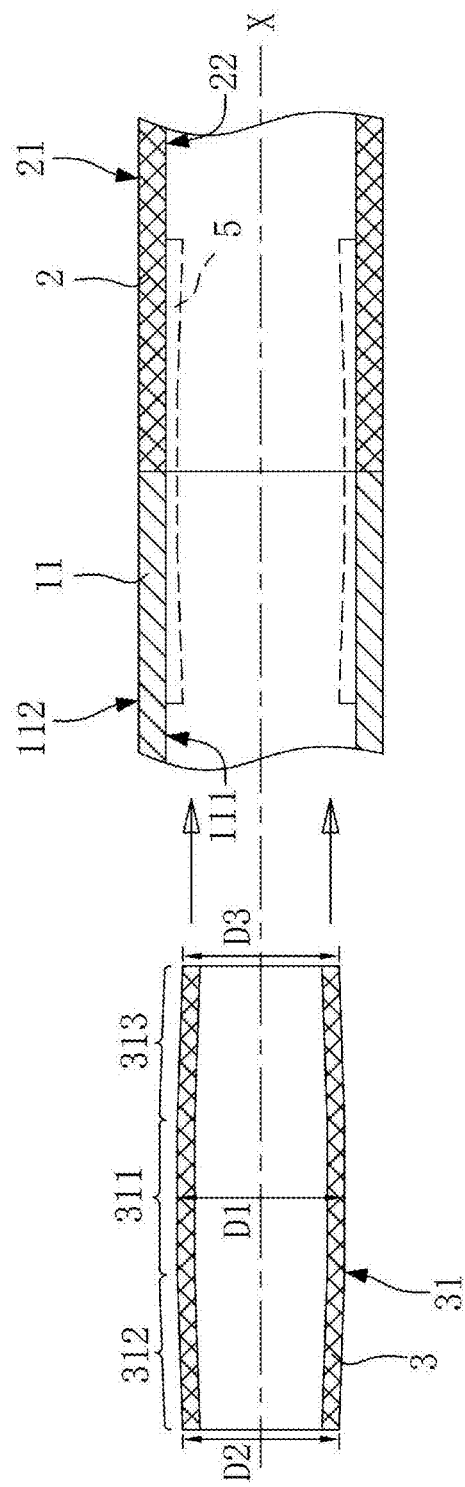
FIG. 5 is a schematic diagram of an assembly relationship between another convex tube and an extension tube as well as a shaft tube according to an embodiment of the present disclosure.

As shown in FIG. 5, for convenience of manufacturing, the bus bar of the outer circumferential surface 31 of the convex tube can also be formed by a smooth transition connection between a middle linear segment 311 and a left-end linear segment 312 as well as a right-end linear segment 313. The left end of the left-end linear segment 312 is inclined inward, and the right end of the right-end linear segment 313 is also inclined inward, so as to form a convex tube 3 with the middle part convex outward.

As shown in FIG. 1 and FIG. 5, the inner adhesive rubber ring 7 is filled in the inner seam 5, and the thickness of the inner adhesive rubber ring 7 has a variable thickness size distribution in the axis direction X. The inner adhesive rubber ring 7 is an inner adhesive rubber ring 7 having a variable thickness size distribution in the axis direction X formed by coating the inner seam 5 with an adhesive and solidifying the adhesive. Thus, the convex tube 3 is bonded to the single inner cylindrical surface 111, 22 formed by abutting the two tubes 11 and 2 to each other at the abutting position by means of a bonding mode.

Figure 6:
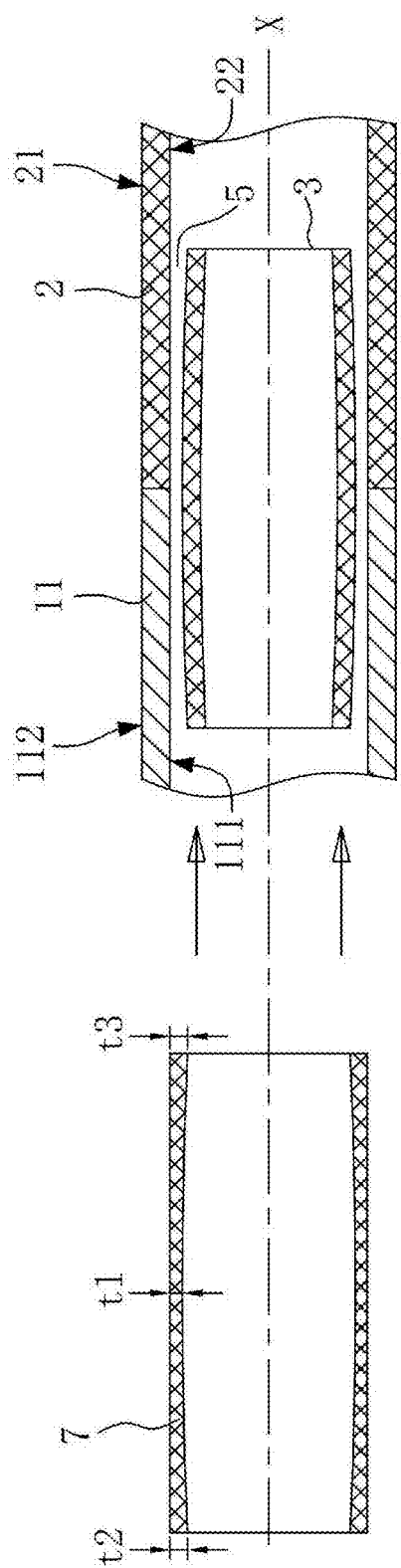
FIG. 6 is a schematic diagram of a connection relationship among an inner adhesive rubber ring, a convex tube and an extension tube as well as a shaft tube according to an embodiment of the present disclosure.

As shown in FIG. 1, FIG. 4, FIG. 5 and FIG. 6, the gap at the middle part of the inner seam 5 is the smallest, and the gap from the middle part to the left end and right end of the inner seam 5 gradually increases, so that the thickness t1 of the middle part of the inner adhesive rubber ring 7 formed by solidification after the inner seam 5 is fully coated with an adhesive is the smallest. In FIG. 6, the thickness at the left part of the inner adhesive rubber ring 7 gradually increases from t1 to t2, and the thickness at the right part of the inner adhesive rubber ring 7 gradually increases from t1 to t3. Generally, the thickness t1 ranges from 0.0 to 0.3 mm, and the thicknesses t2 and t3 are determined by sample experiments or computer aided engineering (CAE) calculation and analysis. In this way, the shape change of the bus bar of the outer circumferential surface 31 of the convex tube can be determined. The goal of the change of the thickness of the inner adhesive rubber ring 7 is to achieve a more uniform distribution of the circumferential shear stress caused by the power torque in the inner adhesive rubber ring 7 during transmission of the power torque. Generally, $t2=t3\approx t1+1$ mm can meet the requirements.

FIG. 4 and FIG. 5 disclose the bus bars of outer circumferential surfaces 31 of different convex tubes. The bus bar of the outer circumferential surface 31 of the convex tube in FIG. 4 is a single elliptical arc. The bus bar of the outer circumferential surface 31 of the convex tube in FIG. 5 is formed by a smooth transition of three linear lines. By comparison, the stress distribution uniformity effect caused by the convex tube 3 and the inner adhesive rubber ring 7 formed through the outer circumferential surface 31 of the convex tube in FIG. 4 is better than that caused by the convex tube 3 and the inner adhesive rubber ring 7 formed through the outer circumferential surface 31 of the convex tube in FIG. 5.

Figure 7:
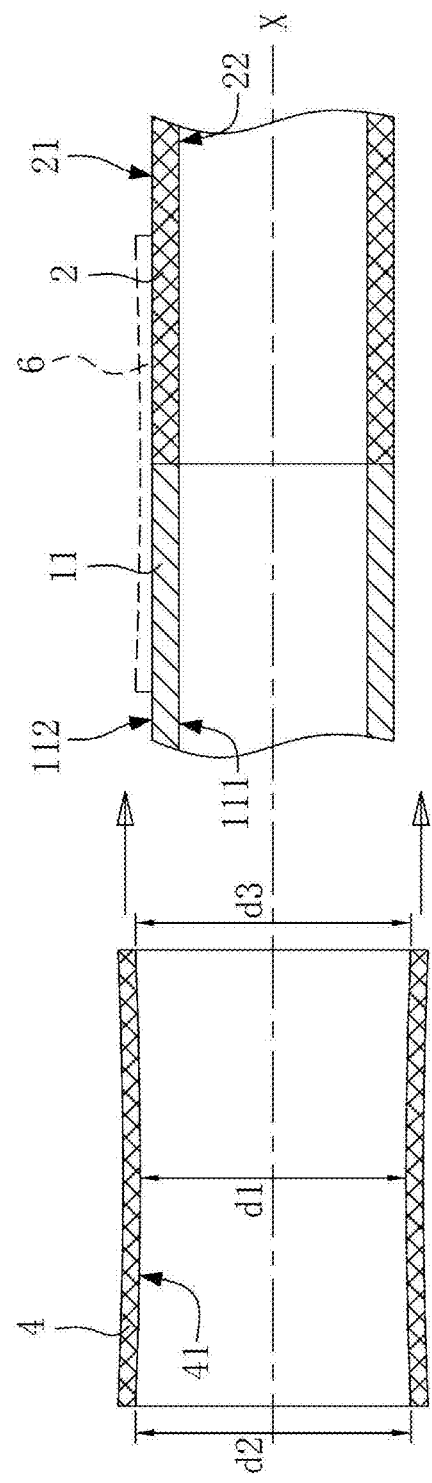
FIG. 7 is a schematic diagram of an assembly relationship between a concave tube and an extension tube as well as a shaft tube according to an embodiment of the present disclosure.

As shown in FIG. 1 and FIG. 7, the middle part of the inner circumferential surface 41 of the concave tube 4 is concave inward, and the diameter d1 at the middle part of the inner circumferential surface 41 of the concave tube is less than the diameters d2 and d3 at two ends of the inner circumferential surface 41 of the concave tube. As shown in FIG. 7, the bus bar of the inner circumferential surface 41 of the concave tube is an elliptical arc that is concave in the middle. The concave tube 4 is sleeved on the extension tube 11 and the shaft tube 2 at the abutting position therebetween in the axis direction X, and the concave tube 4 is located outside the outer cylindrical surface 112 of the extension tube and the outer cylindrical surface 21 of the shaft tube. An outer seam 6 is formed between the inner circumferential surface 41 of the concave tube and the outer cylindrical surface 112 of the extension tube as well as the outer cylindrical surface 21 of the shaft tube at the abutting position therebetween. Since the middle part of the concave tube 4 is concave inward, the outer seam 6 has a variable gap size distribution in the axis direction X.

As shown in FIG. 7, specifically, the concave tube 4 is precisely manufactured directly by a cutting-free process, which is conducive to saving the material consumption, simplifying the manufacturing process, increasing the production efficiency and reducing the manufacturing cost. The concave tube 4 can be manufactured by processing a metal blank tube such as a steel tube through expansion forming, rotary forging forming or rolling forming. Alternatively, the concave tube 4 can be manufactured by contour machining of a non-metal material such as a carbon fiber composite material by using a plastic molding process.

Figure 8:
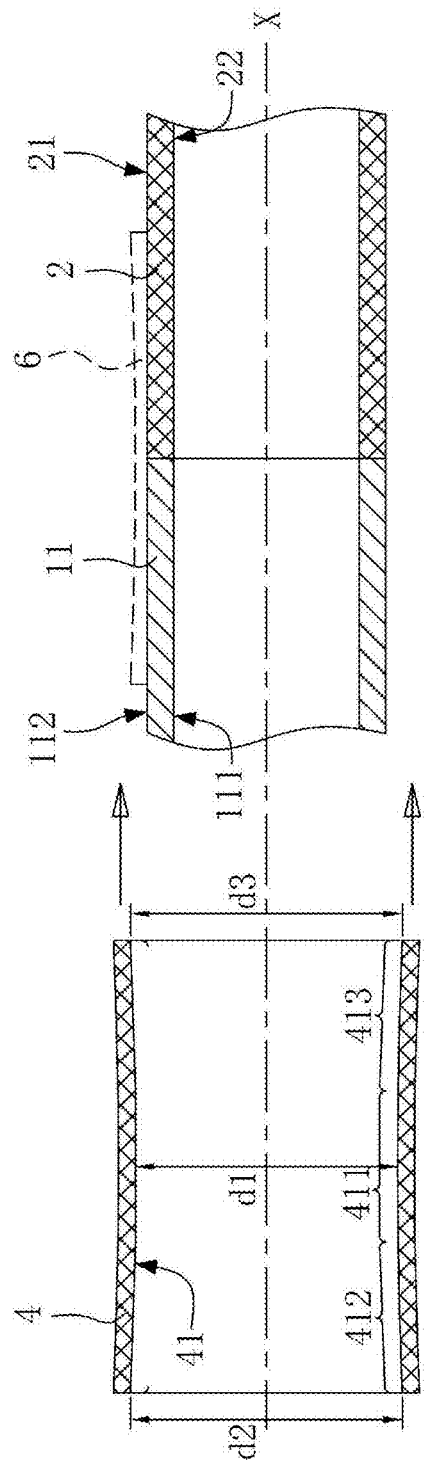
FIG. 8 is a schematic diagram of an assembly relationship between another concave tube and an extension tube as well as a shaft tube according to an embodiment of the present disclosure.

As shown in FIG. 8, for convenience of manufacturing, the bus bar of the inner circumferential surface 41 of the concave tube can also be formed by a smooth transition connection between a middle linear segment 411 and a left-end linear segment 412 as well as a right-end linear segment 413. The left end of the left-end linear segment 412 is inclined outward, and the right end of the right-end linear segment 413 is also inclined outward, so as to form a concave tube 4 with the middle part concave inward.

As shown in FIG. 1, FIG. 7, FIG. 8 and FIG. 9, the outer adhesive rubber ring 8 is filled in the outer seam 6, and the thickness of the outer adhesive rubber ring 8 has a variable thickness size distribution in the axis direction X. The outer adhesive rubber ring 8 has a variable thickness size distribution in the axis direction X and is formed by coating the outer seam 6 with an adhesive and solidifying the adhesive. Thus, the concave tube 4 is bonded to the single outer cylindrical surface 112, 21 formed by abutting the two tubes 11 and 2 to each other at the abutting position by means of a bonding mode.

Figure 9:
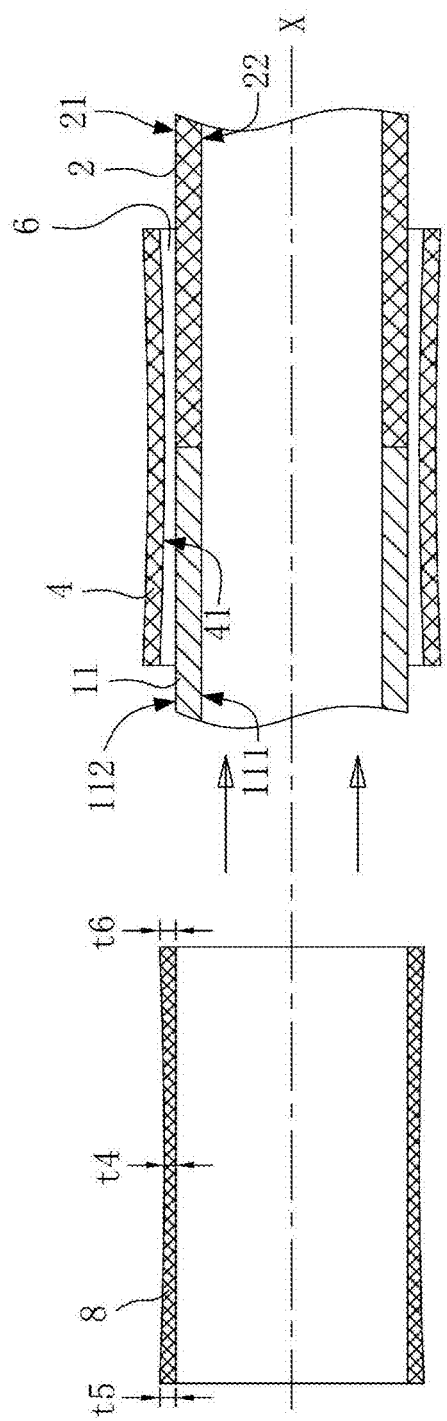
FIG. 9 is a schematic diagram of a connection relationship among an outer adhesive rubber ring, a concave tube and an extension tube as well as a shaft tube according to an embodiment of the present disclosure.

As shown in FIG. 1, FIG. 7 and FIG. 9, the gap at the middle part of the outer seam 6 is the smallest, and the gap from the middle part to the left end and right end of the outer seam 6 gradually increases, so that the thickness t4 of the middle part of the outer adhesive rubber ring 8 formed by solidification after the outer seam 6 is fully coated with an adhesive is the smallest. In FIG. 9, the thickness at the left part of the outer adhesive rubber ring 8 gradually increases from t4 to t5, and the thickness at the right part of the outer adhesive rubber ring 8 gradually increases from t4 to t6. Generally, the thickness t4 ranges from 0.0 to 0.3 mm, and the thicknesses t5 and t6 are determined by sample experiments or CAE calculation and analysis. In this way, the shape change of the bus bar of the inner circumferential surface 41 of the concave tube can be determined. The goal of the change of the thickness of the outer adhesive rubber ring 8 is to achieve a more uniform distribution of the circumferential shear stress caused by the power torque in the outer adhesive rubber ring 8 during transmission of the power torque. Generally, $t5=t6\approx t4+1$ mm can meet the requirements.

FIG. 7 and FIG. 8 disclose the bus bars of inner circumferential surfaces 41 of different concave tubes. The bus bar of the inner circumferential surface 41 of the concave tube in FIG. 7 is a single elliptical arc. The bus bar of the inner circumferential surface 41 of the concave tube in FIG. 8 is formed by a smooth transition of three linear lines. By comparison, the stress distribution uniformity effect caused by the concave tube 4 and the outer adhesive rubber ring 8 formed through the inner circumferential surface 41 of the concave tube in FIG. 7 is better than that caused by the concave tube 4 and the outer adhesive rubber ring 8 formed through the inner circumferential surface 41 of the concave tube in FIG. 8.

As shown in FIGS. 1 to 9, after the extension tube 11 of the universal joint 1 is abutted to the shaft tube 2 in the axis direction X, by combining the convex tube 3, the concave tube 4, the inner adhesive rubber ring 7 and the outer adhesive rubber ring 8, both the inner and outer sides are connected by means of bonding. The present disclosure has the beneficial effect that the inner adhesive rubber ring 7 and the outer adhesive rubber ring 8 can be fully used for simultaneously transmitting a power torque, thus improving the power torque bearing capability of the shaft tube joint of the drive shaft.

In conclusion, according to the shaft tube joint structure of a drive shaft provided in the present disclosure, after the extension tube 11 and the shaft tube 2 are abutted to each other, the convex tube 3 and the concave tube 4 are added inside and outside for double-sided bonding to form the inner adhesive rubber ring 7 with a variable thickness and the outer adhesive rubber ring 8 with a variable thickness to simultaneously transmit the power torque. The above bonding mode basically eliminates the stress concentration phenomenon in the inner adhesive rubber ring 7 and the outer adhesive rubber ring 8 due to uneven distribution of the circumferential shear stress caused by the power torque, which improves the power torque bearing capability of the shaft tube joint of the drive shaft. Therefore, the present disclosure effectively overcomes various defects in the prior art and has high industrial utilization value.

The shaft tube joint structure of a drive shaft provided in the embodiments of the present disclosure is described in detail above. Those skilled in the art can make various modifications in terms of specific implementations and application scope according to the idea of the embodiments of the present disclosure. In conclusion, the contents of this specification should not be understood as a limitation of the present disclosure. All equivalent modifications or changes made in accordance with the spirit and technical idea of the present disclosure still should be covered by the claims of the present disclosure.

The invention claimed is:

1. A shaft tube joint structure of a drive shaft, comprising:
an extension tube, having an inner cylindrical surface of the extension tube and an outer cylindrical surface of the extension tube;
a shaft tube, abutted to the extension tube in an axis direction and having an inner cylindrical surface of the shaft tube and an outer cylindrical surface of the shaft tube, wherein the inner cylindrical surface of the extension tube is abutted to the inner cylindrical surface of the shaft tube, and the outer cylindrical surface of the extension tube is abutted to the outer cylindrical surface of the shaft tube;
a convex tube, having an outer circumferential surface of the convex tube, sleeved in the extension tube and the shaft tube at an abutting position between the extension tube and the shaft tube in the axis direction, and located inside the inner cylindrical surface of the extension tube and the inner cylindrical surface of the shaft tube, wherein an inner seam having a variable gap size distribution in the axis direction is formed between the outer circumferential surface of the convex tube and the inner cylindrical surface of the extension tube as well as the inner cylindrical surface of the shaft tube at the abutting position between the extension tube and the shaft tube;
an inner adhesive rubber ring, filled in the inner seam, wherein a thickness of the inner adhesive rubber ring has a variable thickness size distribution in the axis direction;
a concave tube, having an inner circumferential surface of the concave tube, sleeved on the extension tube and the shaft tube at the abutting position between the extension tube and the shaft tube in the axis direction, and located outside the outer cylindrical surface of the extension tube and the outer cylindrical surface of the shaft tube, wherein an outer seam having a variable gap size distribution in the axis direction is formed between the inner circumferential surface of the concave tube and the outer cylindrical surface of the extension tube as well as the outer cylindrical surface of the shaft tube at the abutting position between the extension tube and the shaft tube; and an outer adhesive rubber ring, filled in the outer seam, wherein a thickness of the outer adhesive rubber ring has a variable thickness size distribution in the axis direction;

wherein a diameter at a middle part of the outer circumferential surface of the convex tube is greater than diameters at two ends of the outer circumferential surface of the convex tube.

2. The shaft tube joint structure of the drive shaft as in claim 1, wherein the shaft tube is made of a carbon fiber composite material.

3. The shaft tube joint structure of the drive shaft as in claim 1, further comprising a universal joint, wherein the extension tube is a part of the universal joint and extends from the universal joint in the axis direction.

4. The shaft tube joint structure of the drive shaft as in claim 1, wherein a bus bar of the outer circumferential surface of the convex tube is an elliptical arc that is convex in the middle.

5. The shaft tube joint structure of the drive shaft as in claim 1, wherein a bus bar of the outer circumferential surface of the convex tube is formed by a smooth transition connection between a middle linear segment and end linear segments inclined inward at two ends of the middle linear segment.

6. The shaft tube joint structure of the drive shaft as in claim 1, wherein a diameter at a middle part of the inner circumferential surface of the concave tube is less than diameters at two ends of the inner circumferential surface of the concave tube.

7. The shaft tube joint structure of the drive shaft as in claim 6, wherein a bus bar of the inner circumferential surface of the concave tube is an elliptical arc that is concave in the middle.

8. The shaft tube joint structure of the drive shaft as in claim 6, wherein a bus bar of the inner circumferential surface of the concave tube is formed by a smooth transition connection between a middle linear segment and end linear segments inclined outward at two ends of the middle linear segment.

9. The shaft tube joint structure of the drive shaft as in claim 1, wherein the concave tube and the convex tube are manufactured by processing a metal blank tube through expansion forming, rotary forging forming or rolling forming.

10. The shaft tube joint structure of the drive shaft as in claim 1, wherein the concave tube and the convex tube are manufactured by contour machining of a non-metal material by using a plastic molding process.

11. The shaft tube joint structure of the drive shaft as in claim 1, wherein the inner adhesive rubber ring has a variable thickness size distribution in the axis direction and is formed by coating the inner seam with an adhesive and solidifying the adhesive.

12. The shaft tube joint structure of the drive shaft as in claim 11, wherein a gap at a middle part of the inner seam is less than gaps at two ends of the inner seam, so that a thickness at the middle part of the inner adhesive rubber ring is less than thicknesses at two ends of the inner adhesive rubber ring.

13. The shaft tube joint structure of the drive shaft as in claim 1, wherein the outer adhesive rubber ring has a variable thickness size distribution in the axis direction and is formed by coating the outer seam with an adhesive and solidifying the adhesive.

14. The shaft tube joint structure of the drive shaft as in claim 13, wherein a gap at a middle part of the outer seam is less than gaps at two ends of the outer seam, so that a thickness at the middle part of the outer adhesive rubber ring is less than thicknesses at two ends of the outer adhesive rubber ring.

* * * * *